US008412289B1

(12) United States Patent  (10) Patent No.: US 8,412,289 B1
Oh  (45) Date of Patent: Apr. 2, 2013

(54) EXPENDABLE AND COLLAPSIBLE SOUND AMPLIFYING CELLULAR PHONE CASE

(76) Inventor: Kwang J. Oh, La Crescenta, CA (US)

( * ) Notice: Subject to any disclaimer, the term of this patent is extended or adjusted under 35 U.S.C. 154(b) by 0 days.

(21) Appl. No.: 13/403,947

(22) Filed: Feb. 23, 2012

(51) Int. Cl.
  *H04M 1/00* (2006.01)
(52) U.S. Cl. .................. 455/575.1; 345/158; 455/550.1
(58) Field of Classification Search .............. 455/569.1, 455/575.4, 575.1, 553.1, 575.3, 41.3, 571.1, 455/550.1; 381/151, 412, 335; 348/14.01; 320/107; 345/158
  See application file for complete search history.

(56) References Cited

U.S. PATENT DOCUMENTS

| 5,046,104 | A  | * | 9/1991 | Kloss ............................. 381/335 |
| 2005/0110752 | A1 | * | 5/2005 | Pedersen et al. ............... 345/158 |
| 2006/0046770 | A1 | * | 3/2006 | Zhu et al. .................... 455/550.1 |
| 2008/0227506 | A1 | * | 9/2008 | Corrigan et al. ........... 455/575.5 |

* cited by examiner

*Primary Examiner* — Mahendra Patel
(74) *Attorney, Agent, or Firm* — John K. Park; Park Law Firm

(57) ABSTRACT

A cell phone protective case, with expander of sound outlet located on the right and left sides and the bottom perimeters, of a cell phone is invented. The frame interior is comprised of a circular throat member for sound impedance, matching to create an improved coupling effect between the original speaker, and the air, where the frame interior is comprised of sectional chambers covering both the horizontal and vertical coverage axis' to change the directional characteristics of sound waves to amplify and channel the sound en route towards the outer perimeters of the device.

12 Claims, 2 Drawing Sheets

EXPENDABLE AND COLLAPSIBLE SOUND AMPLIFYING CELLULAR PHONE CASE

FIELD OF THE INVENTION

The present invention generally relates to creating a more seasonal listening experience with cell phones in an efficient energy saving mode.

BACKGROUND OF THE INVENTION

A disadvantage of the conventional speaker located in the rear panel of a cell phone is that it is of a poor sound quality. Relative to solids and liquids, air is a poor conductor of sound. In air, the atoms are not as close together, and cannot respond quickly to each other's motions, and transmit the sound energy.

The speaker-phone function is used while the phone is located outside. The transmitted sound is either all absorbed by a user's hand if the device is held in the palm with the sound port completely covered. Or, the sound is baffled by the conventional cases that don't appreciate any passages to channel the sound.

After the transmitted sound blends with the surrounding noise, the result is a dissonant sound as it finally impinges the end user.

A further disadvantage of the conventional cases, which is typical to many small media devices such as radios and walkmans, is that the devices' oscillator is tuned so that it produces sounds at higher frequencies. This configuration denatures the timbre of the emanating sound by depreciating the lower bass frequencies. The present invention is to: 1) amplify the sound by changing the directional characteristics of the sound waves by the use of the interior chamber. The chamber redirects the sound waves from the originating source down towards the speaker ports located on the outer-rims of the device. 2) Create a "reverse-engineering" effect on the propagated sound waves by depressing the frequencies thru sectional chambers lined with membranes of varying stiffness.

BRIEF SUMMARY OF THE INVENTION

A cell phone protective case is disclosed with sound outlets located in the right and left sides and the bottom perimeters, of a cell phone create appreciable sound effects, is disclosed. The frame interior comprises of three sectional chambers with the bottom layer mainly covering the horizontal coverage axis. The top two layers, gradually decreasing in width to modify the frequencies in piecemeal together with the bottom chamber, create a more seasonal listening experience.

SUMMARY OF INVENTION

The present invention is a slightly denser case frame, where the frame is equipped with an interior "reverse-engineering" chamber. Depending on the circumstances, as noted previously, the timbre and overall intensity of the emanating sound are often baffled. This lowers the sophistication of the devices' multiple speaker-like-qualities such as: 1) music listening, 2) real-time driving directions, 3) schedule announcements, 4) two-way dialogue, 5) videos, and 6) television. In other words, today's mobile-phone has become a multi-function media device in which sophisticated sound transmission is of central importance and high demand.

The present invention was engineered according to a basic biological analogue of the human ear. After sound starts with the vibration of some material object, or voice, the vibrations strike the eardrum and get amplified by tiny bones in the middle ear, striking the cochlea. The membrane that separates the different chambers in the cochlea varies in stiffness, causing each section to vibrate at a different frequency.

Based on the biological reality of these neural signals within one cerebrum appreciating-sound, it is an object of the present invention to reverse-engineer the otherwise entwined higher pitched frequencies en route, more in piecemeal. The frequencies are channeled en route thru the bottom sectional layer, where they are "de-pressed" to create lower pitched sounds. The preferred arrangement of the reverse-engineering chamber is operatively associated with the originating speaker thru a throat piece caused an "O-ring." The "O-ring" is a circular member that clamps onto/over the originating speaker, in which the initially restricted area of the throat prevents the passage of air, thus serving as an impedance matching mechanism.

In this arrangement, as the energy of wave motion is propagated outward from the center of disturbance, or the originating speaker located on the rear panel of said mobile-phone device, the reverse-engineering chamber channels the lower frequencies a "de-press" bottom sectional layer. The bottom section is lined with a loose membrane/material, resembling the membranes that separate the different chambers in the cochlea. The wall lining or thin "membranes" impel the lower-pitched sounds through the speakers located on the outer rims of the device. The top sectional layers, occupying a smaller area along the horizontal coverage axis, channel the higher-pitched frequencies through an area line with a stiffer membrane/material. Because most sounds are a composite of frequencies, the reverse-engineering process effectively delivers the pre-entwined lower-pitched frequency en route by piecemeal, thereby creating a more seasoned listening experience.

DETAILED DESCRIPTION OF THE PREFERRED EMBODIMENT

Figure 1:
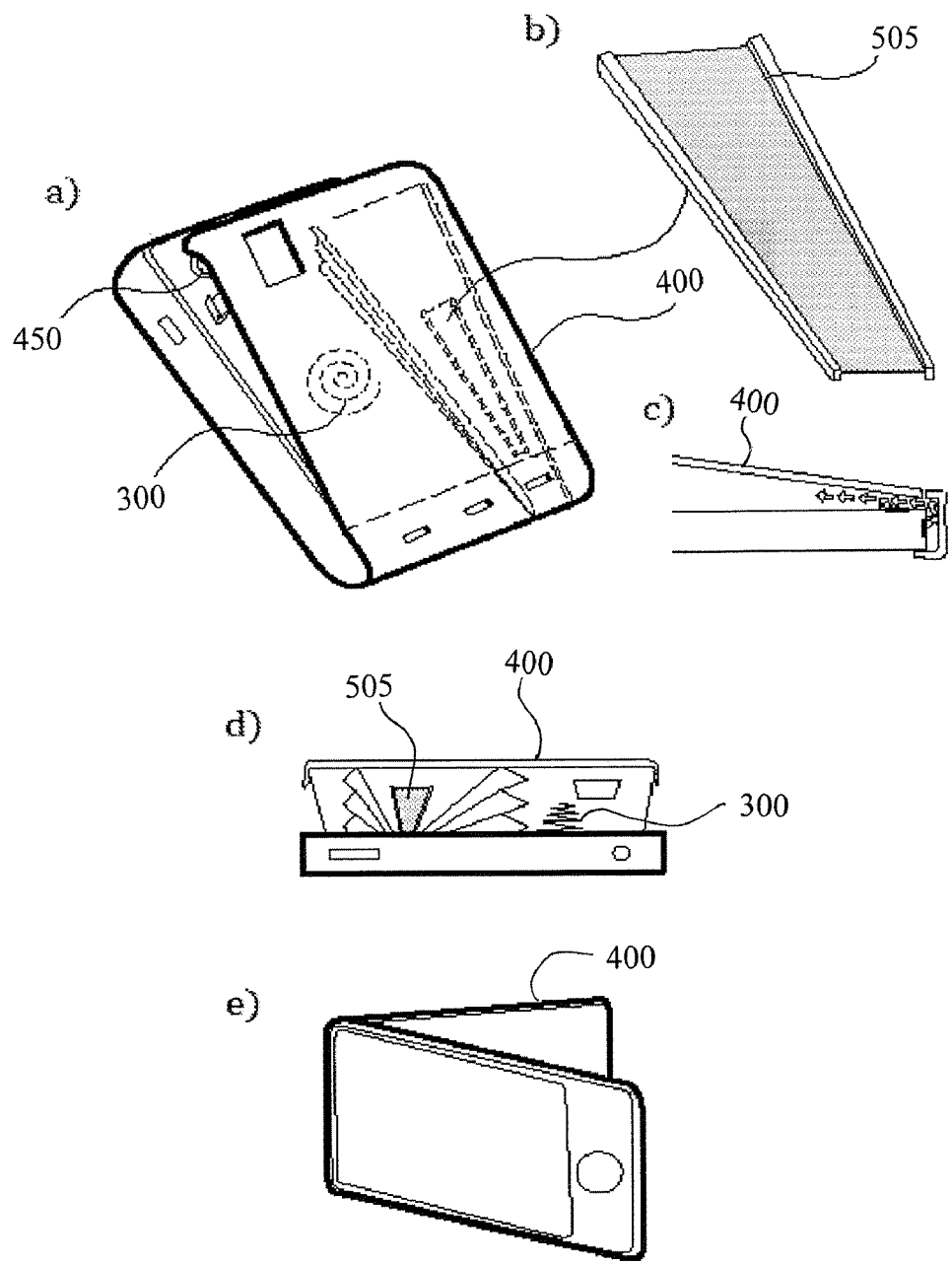
FIG. 1 contains detailed drawing of the back of the cell phone sound amplifier foldable case when opened.

FIG. 1 *a*) depicts detailed drawing of the expendable and collapsible sound amplifying cellular phone case when opened. The sound amplifying vibrating membrane (505) is attached to the cell phone stationary cover case (400). The camera lens (450) lies under the cell phone stationary cover case. The spring (300) that holds the cell phone stationary case, depicted as dotted circular shaped drawing, is compressed and elongated when the case is pressed down; FIG. 1 *b*) depicts enlarged drawing of the sound amplifying vibrating membrane 505; FIG. 1 *c*) depicts the side view of the end side of the cell phone stationary case when opened. The sound is emitted from the cell phone speaker attached at the end side of the cell phone, through the small gap created in between the cell phone and the cell phone case; FIG. 1 *d*) shows cross sectional view of the expendable and collapsible sound amplifying cellular phone case when opened. FIG. 1 *e*) shows side view of the cell phone of when the case is opened. In order for the sound to be properly amplified, the sound amplifying vibrating membrane 505 should be expanded from the stationary speaker case 400. Once the sound is amplified, the sound can be exited through the gap created in between the case 400 and the stationary expander case 505. This is the preferred embodiment of the invention.

Figure 2:
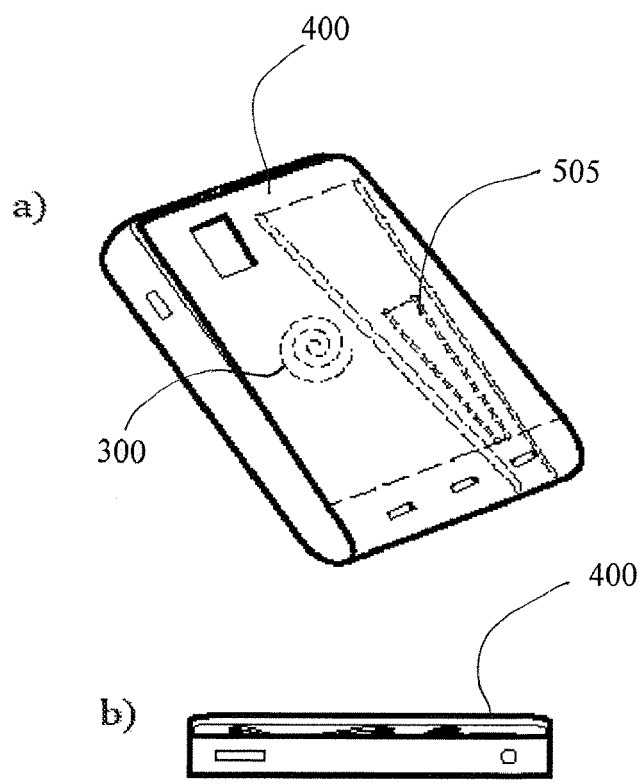
FIG. 2 contains detailed drawing of the back of the cell phone sound amplifier foldable case when closed.

FIG. 2 *a*) contains detailed drawing of the back of the cell phone sound amplifier foldable case when closed; FIG. 2 *b*) depicts cross sectional view of the expendable and collapsible sound amplifying cellular phone case when closed.

What is claimed is:

1. A sound-amplifying cell phone case for a cell phone with a sound outlet located on the right and left side and the bottom perimeters, the cell phone case comprising:
   a cover case for enclosing and covering a rear portion of the cell phone;
   a circular throat member provided in a frame interior to cover the sound outlet for sound impedance, matching to create an improved coupling effect between the original speaker and the air;
   sectional chambers covering both the horizontal and vertical coverage axis' to receive and change the directional characteristics of sound waves from the circular throat member to amplify and channel the sound en route towards the outer perimeters of the device; and
   a spring disposed between the cover case and the rear portion of the cell phone for having the cover case opened at a specific angle,
   wherein the cover case pops up when pressed down, as the spring sustains the cover case when compressed and expanded,
   wherein the cover case further comprises a pair of gripping corner portions provided at two corners at the opening end for holding two corresponding corners of the cellular phone so as to close the cover case overcoming the opening force of the spring.

2. The sound-amplifying cell phone case of claim 1, wherein the cell phone case is adapted to be used as a stand when the cover case is slightly opened and laid across the table.

3. The sound-amplifying cell phone case of claim 1, wherein the cell phone case is adapted to be used as a video viewing stand when the cover case is slightly opened and laid across the table.

4. The sound-amplifying cell phone case of claim 1, wherein the cover case comprises:
   a fixing end where the cell phone case is attached to the cell phone; and
   an opening end where the cover case is opened with the fixing end as an axis.

5. The sound-amplifying cell phone case of claim 4, wherein the circular throat member is provided in the fixing end of the cover case where the sound outlet is provided.

6. An expandable and collapsible sound-amplifying case for a cellular phone having a sound outlet of a speaker and a camera lens, the case comprising:
   a cover case having a fixing end configured to be attached to a top edge of the cellular phone and an opening end configured to be opened and closed with the fixing end as a hinge;
   a sectional chambers attached to an inner surface of the cover case and a rear surface of the cellular phone and disposed between the fixing end of the cover case and the opening end and configured to receive, guide toward the opening end, and amplify sound wave from the sound outlet of the cellular phone; and
   a spring installed between the inner surface of the cover case and the rear surface of the cellular phone and configured to open the cover case,
   wherein the cover case is opened with a specific angle determined by interplay of an opening force of the spring and a limiting force of the sectional chambers attached to the inner surface of the cover case and the rear surface of the cellular phone,
   wherein the cover case is configured to be closed,
   wherein the cover case further comprises a pair of gripping corner portions provided at two corners at the opening end for holding two corresponding corners of the cellular phone so as to close the cover case overcoming the opening force of the spring.

7. The expandable and collapsible sound-amplifying case of claim 6, wherein the cover case further comprises a through-hole for the camera lens.

8. The expandable and collapsible sound-amplifying case of claim 6, further comprising a hinge line provided at the fixing end, at which the opening end is opened with the hinge line as the hinge.

9. The expandable and collapsible sound-amplifying case of claim 6, wherein the sectional chambers comprise a sound amplifying vibrating membrane.

10. The expandable and collapsible sound-amplifying case of claim 9, wherein the sectional chambers are configured to be unfolded and folded according to the opening and closing of the cover case, respectively.

11. The expandable and collapsible sound-amplifying case of claim 9, wherein sectional chambers further comprises a throat member opened to the sound outlet through the fixing end of the cover case for guiding the sound wave from the sound outlet toward the opening end of the cover case through the wedge-shaped gap of the unfolded sectional chambers.

12. The expandable and collapsible sound-amplifying case of claim 6, wherein the fixing end comprises a gripping portion for enclosing and gripping the top edge of the cellular phone.

\* \* \* \* \*